US012399697B2

(12) United States Patent
Paulraj et al.

(10) Patent No.: US 12,399,697 B2
(45) Date of Patent: Aug. 26, 2025

(54) SECURE SMART NETWORK INTERFACE CONTROLLER FIRMWARE UPDATE

(71) Applicant: Dell Products L.P., Round Rock, TX (US)

(72) Inventors: Deepaganesh Paulraj, Bangalore (IN); Lee E. Ballard, Georgetown, TX (US); Aniruddha Herekar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 387 days.

(21) Appl. No.: 17/730,720

(22) Filed: Apr. 27, 2022

(65) Prior Publication Data

US 2023/0351019 A1    Nov. 2, 2023

(51) Int. Cl.
*G06F 8/65* (2018.01)
*G06F 21/54* (2013.01)
*H04L 61/5014* (2022.01)

(52) U.S. Cl.
CPC ............... *G06F 8/65* (2013.01); *G06F 21/54* (2013.01); *H04L 61/5014* (2022.05)

(58) Field of Classification Search
None
See application file for complete search history.

(56) References Cited

U.S. PATENT DOCUMENTS

| | | | | |
|---|---|---|---|---|
| 8,495,292 | B2 * | 7/2013 | Flynn | G06F 3/0688 |
| | | | | 711/E12.078 |
| 9,177,122 | B1 * | 11/2015 | Trier | G06F 8/65 |
| 10,177,934 | B1 * | 1/2019 | Marr | H04L 12/40032 |
| 12,045,478 | B1 * | 7/2024 | Jha | G06F 3/0679 |
| 2007/0266120 | A1 * | 11/2007 | Tallieu | G06F 9/4416 |
| | | | | 712/E9.032 |
| 2012/0221774 | A1 * | 8/2012 | Atkisson | G06F 12/126 |
| | | | | 711/135 |
| 2015/0121355 | A1 * | 4/2015 | Chang | G06F 8/654 |
| | | | | 717/168 |
| 2016/0014073 | A1 * | 1/2016 | Reddy | H04L 41/0897 |
| | | | | 713/2 |
| 2018/0336026 | A1 * | 11/2018 | Park | H04L 67/34 |
| 2019/0103972 | A1 * | 4/2019 | Pope | H04L 9/0894 |
| 2020/0142683 | A1 * | 5/2020 | Rao | G06F 9/4411 |
| 2020/0257518 | A1 * | 8/2020 | Liedtke | G06F 8/65 |
| 2021/0226846 | A1 * | 7/2021 | Ballard | H04L 41/0843 |
| 2021/0351948 | A1 * | 11/2021 | Lewis | H04L 63/0876 |
| 2022/0263916 | A1 * | 8/2022 | Shah | G06F 13/382 |

(Continued)

OTHER PUBLICATIONS

Zhang, "Bringing the OpenBMC for Platform Management System in Telco Cloud", 2019, Helsinki Metropolia University of Applied Sciences (Year: 2019).*

*Primary Examiner* — Hossain M Morshed (74) *Attorney, Agent, or Firm* — Jackson Walker L.L.P.

(57) ABSTRACT

An information handling system may include a host system, a management controller configured to provide out-of-band management of the information handling system, and a network interface controller. The management controller may be configured to: determine an inventory of the network interface controller, the inventory indicating at least one component having a firmware; retrieve a firmware update image for updating the firmware; and cause the network interface controller to boot from the firmware update image, the firmware update image being configured to install an update to the firmware.

18 Claims, 4 Drawing Sheets

(56) References Cited

U.S. PATENT DOCUMENTS

| | | | |
|---|---|---|---|
| 2022/0284103 A1* | 9/2022 | Eguchi | G06F 21/554 |
| 2022/0291916 A1* | 9/2022 | Liu | G06F 8/65 |
| 2023/0004508 A1* | 1/2023 | Liu | G06F 13/20 |
| 2023/0119437 A1* | 4/2023 | Faasse | G06F 1/3278 |
| | | | 713/300 |

* cited by examiner

SECURE SMART NETWORK INTERFACE CONTROLLER FIRMWARE UPDATE

TECHNICAL FIELD

The present disclosure relates in general to information handling systems, and more particularly to methods and systems for updating firmware in a smart network interface controller.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, global communications. In addition, information handling systems may include a variety of hardware and software components that may be configured to process, store, and communicate information and may include one or more computer systems, data storage systems, and networking systems.

In some computing applications, an information handling system may include a hypervisor for hosting one or more virtual resources such as virtual machines (VMs). A hypervisor may comprise software and/or firmware generally operable to allow multiple virtual machines and/or operating systems to run on a single information handling system at the same time. This operability is generally allowed via virtualization, a technique for hiding the physical characteristics of computing system resources (e.g., physical hardware of the computing system) from the way in which other systems, applications, or end users interact with those resources. Thus, a virtual machine may comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In other applications, an information handling system may be used in a "bare metal" configuration in which only one operating system is installed, and the hypervisor and virtual resources are not needed.

In either a scenario, network interface of the information handling system may comprise a smart network interface card or "SmartNIC" and/or a data processing unit (DPU), which may offer capabilities not found in traditional NICs. For purposes of this disclosure, the terms "SmartNIC" and "DPU" may be used interchangeably. Further, it should be noted that some embodiments may operate on devices other than SmartNICs. For example, graphics processing units (GPUs), infrastructure processing units (IPUs), and other types of accelerators and smart devices may benefit from the ability to deploy an OS as described herein.

A SmartNIC may act as a system within a system, including its own Unified Extensible Firmware Interface Basic Input/Output System (UEFI BIOS), its own management controller such as a baseboard management controller (BMC), and its own operating system (OS) such as ESXio or any other suitable OS.

SmartNICs may also include one or more firmware devices (e.g., a NIC firmware for controlling networking functions of the SmartNIC, a BMC firmware for controlling a management controller of the SmartNIC, a UEFI firmware such as an ARM UEFI firmware for controlling a pre-boot environment of the SmartNIC, etc.), which may need to be updated from time to time. An approach based on UEFI Firmware Management Protocol (FMP) is sometimes used to update components, but there are some SmartNIC devices which do not support FMP. Accordingly, it would be advantageous to have a method for updating the firmware(s) of the various information handling resources that are components of such SmartNICs.

Further, a SmartNIC device may include components that need different types of activation for performing various inventory and/or firmware updates. If such firmware updates are performed via FMP, then it may be necessary or advisable to perform a reboot of the host system each time an update occurs in order to avoid various possible hangs, crashes, or other issues that may occur without a reboot. Thus it may not be possible or advisable, using existing methods, to perform firmware updates in parallel from the host management controller.

Serializing the updates is more time-intensive, but it avoids various issues (e.g., attempts to access a firmware image simultaneously by multiple processes, dead-lock situations, etc.).

Accordingly, this disclosure provides improved techniques for performing firmware updates of components of a SmartNIC, which may be performed in parallel in some embodiments.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with updating firmware in a SmartNIC may be reduced or eliminated.

In accordance with of embodiments the present disclosure, an information handling system may include a host system, a management controller configured to provide out-of-band management of the information handling system, controller. The management and a network interface controller may be configured to: determine an inventory of the network interface controller, the inventory indicating at least one component having a firmware; retrieve a firmware update image for updating the firmware; and cause the network interface controller to boot from the firmware update image, the firmware update image being configured to install an update to the firmware.

In accordance with these and other embodiments of the present disclosure, a method may include, in an information handling system including a host system, a management controller configured to provide out-of-band management of the information handling system, and a network interface controller: the management controller determining an inventory of the network interface controller, the inventory indicating at least one component having a firmware; the management controller retrieving a firmware update image for updating the firmware; and the management controller causing the network interface controller to boot from the firmware update image, the firmware update image being configured to install an update to the firmware.

In accordance with these and other embodiments of the present disclosure, an article of manufacture may include a non-transitory, computer-readable medium having instructions thereon that are executable by at least one processor of a management controller of an information handling system including a host system and a network interface controller for: determining an inventory of the network interface controller, the inventory indicating at least one component having a firmware; retrieving a firmware update image for updating the firmware; and causing the network interface controller to boot from the firmware update image, the firmware update image being configured to install an update to the firmware.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
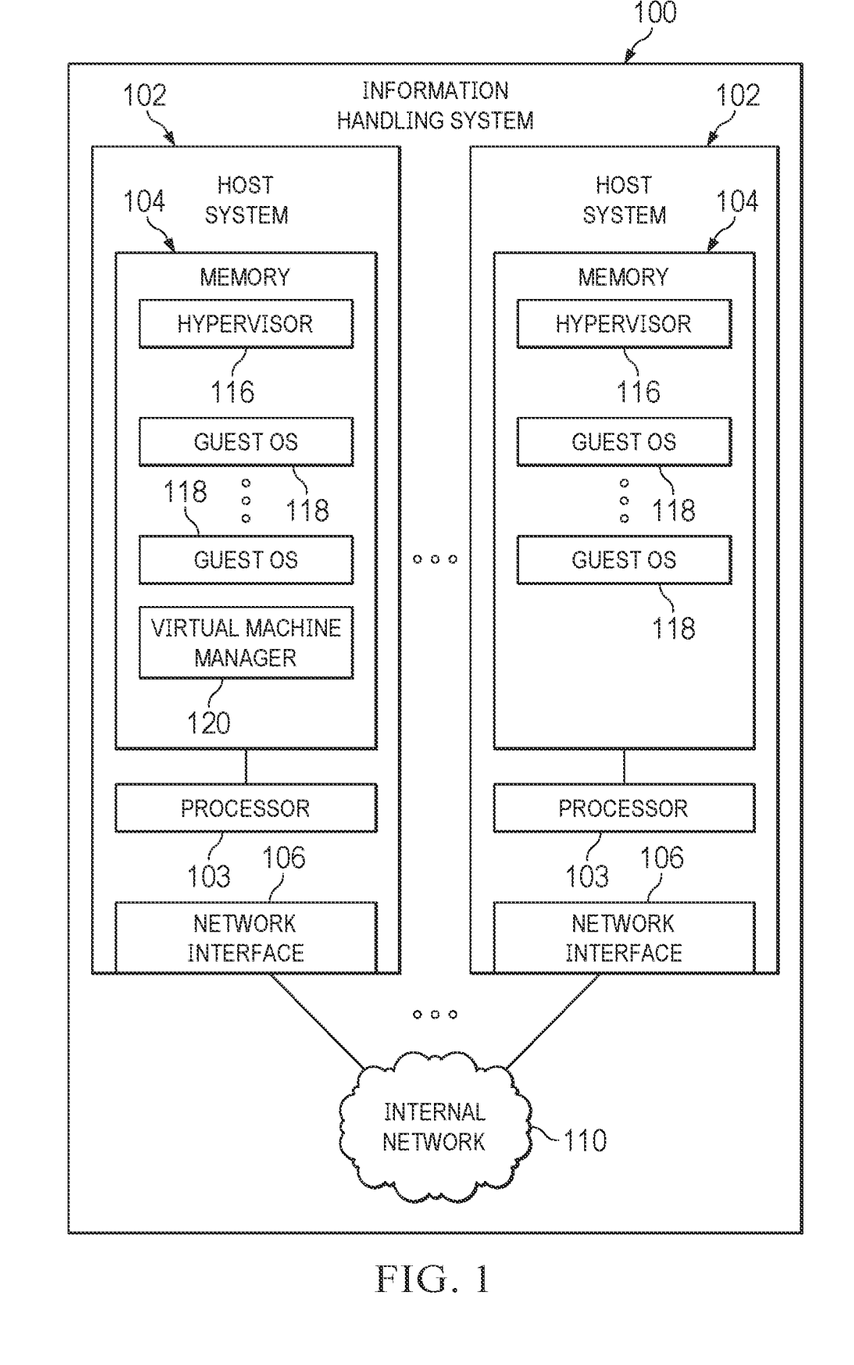
FIG. 1 illustrates a block diagram of selected components of an example information handling system, in accordance with embodiments of the present disclosure.
Figure 2:
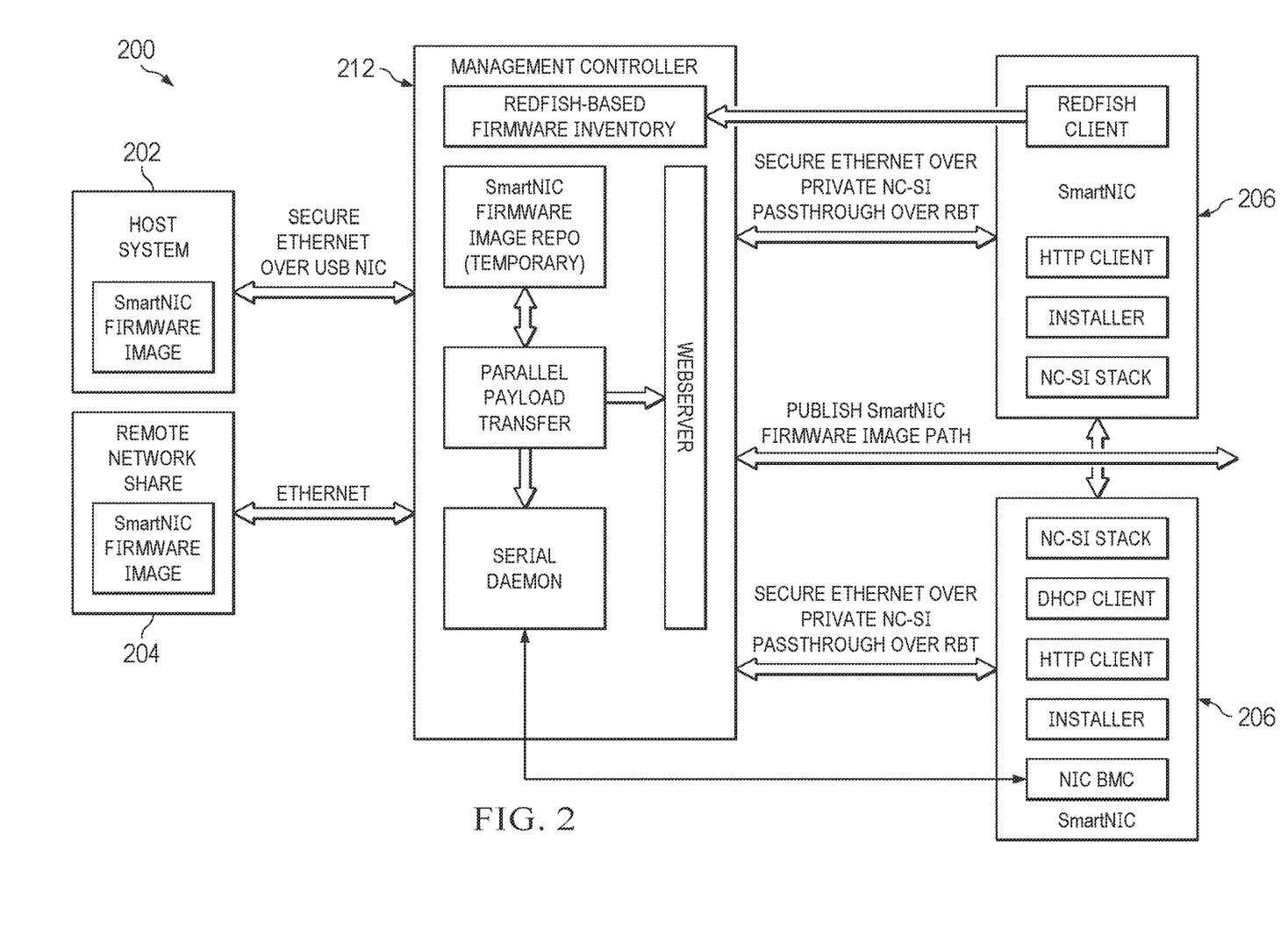
FIG. 2 illustrates a block diagram of selected components of an example information handling system, in accordance with embodiments of the present disclosure.
Figure 3A:
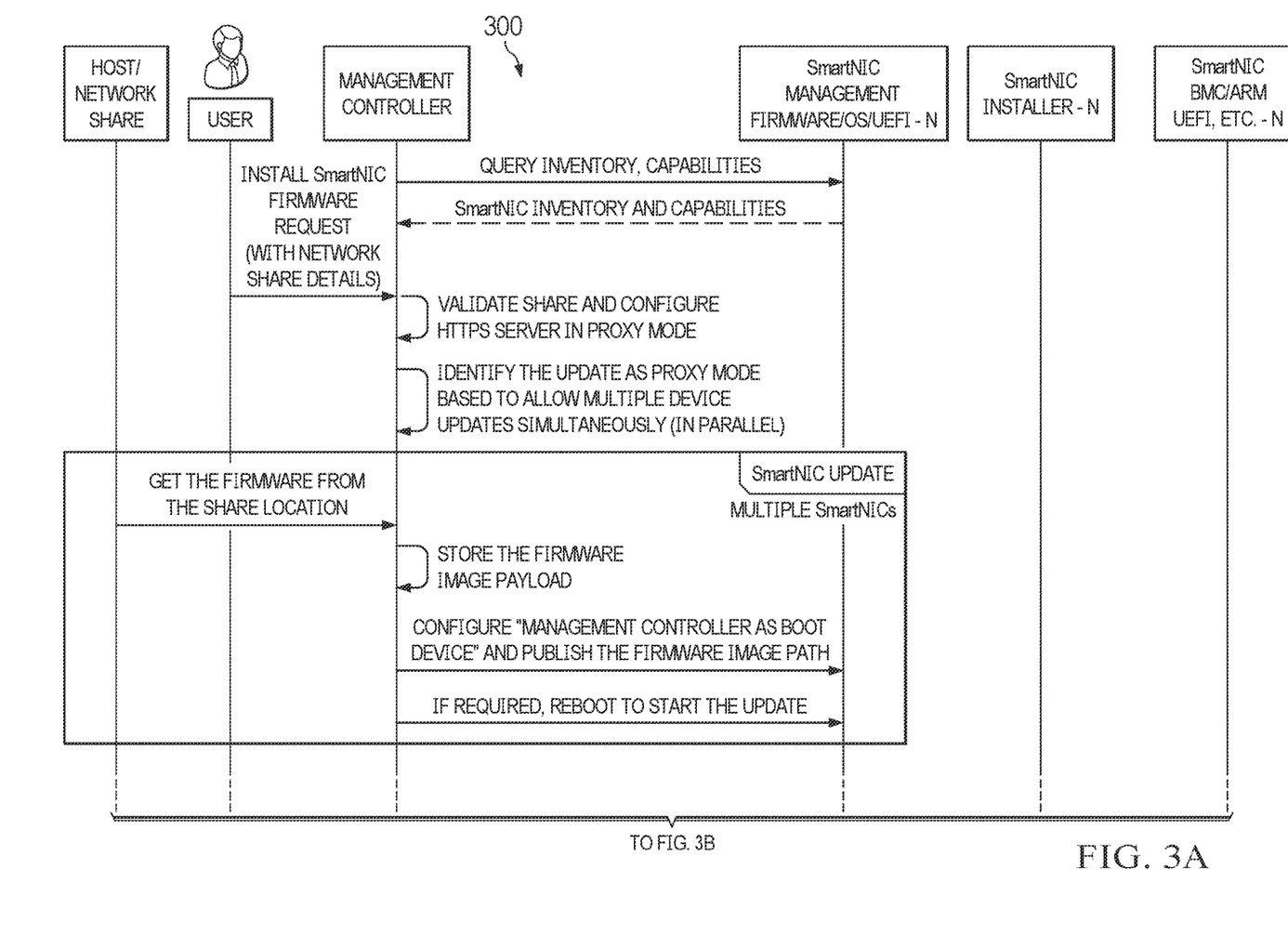
FIGS. 3A and 3B (collectively, FIG. 3) illustrates an example sequence diagram, in accordance with embodiments of the present disclosure.
Figure 3B:
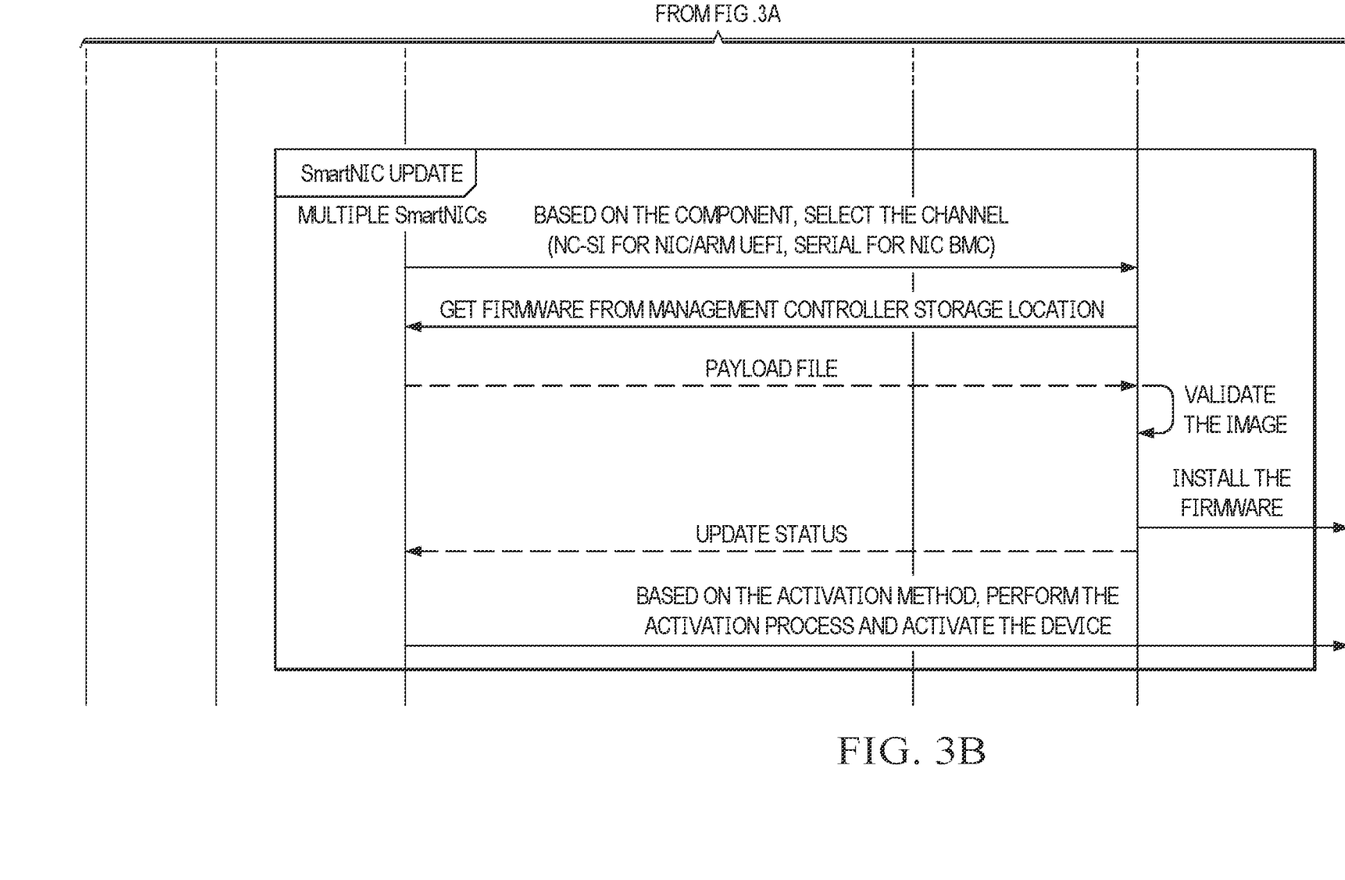

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, form reproduce, handle, or utilize any of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/ or flash memory; communications media such as wires, optical fibers, microwaves, radio waves, and other electromagnetic and/or optical carriers; and/or any combination of the foregoing. Physical computer-readable media such as disk drives, solid-state drives, non-volatile memory, etc. may also be referred to herein as "physical storage resources."

For the purposes 41 disclosure, of the this term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of selected components of an example information handling system 100 having a plurality of host systems 102, in accordance with embodiments of the present disclosure. As shown in FIG. 1, information handling system 100 may include a plurality of host systems 102 coupled to one another via an internal network 110.

In some embodiments, information handling system 100 may include a single chassis housing a plurality of host systems 102. In other embodiments, information handling system 100 may include a cluster of multiple chassis, each with one or more host systems 102. In yet other embodiments, host systems 102 may be entirely separate information handling systems, and they may be coupled together via an internal network an network as the or external such Internet.

In some embodiments, a host system 102 may comprise a server (e.g., embodied in a "sled" form factor). In these and other embodiments, a host system 102 may comprise a personal computer. In other embodiments, a host system 102 may be a portable computing device (e.g., a laptop, notebook, tablet, handheld, smart phone, personal digital assistant, etc.). As depicted in FIG. 1, information handling system 100 may include a processor 103, a memory 104 communicatively coupled to processor 103, and a network interface 106 communicatively coupled to processor 103. For the purposes of clarity and exposition, in FIG. 1, each host system 102 is shown as comprising only a single processor 103, single memory 104, and single network interface 106. However, a host system 102 may comprise any suitable number of processors 103, memories 104, and network interfaces 106.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a memory 104 and/or other computer-readable media accessible to processor 103.

A memory 104 may be communicatively coupled to a processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to information handling system 100 is turned off.

As shown in FIG. 1, a memory 104 may have stored thereon a hypervisor 116 and one or more guest operating systems (OS) 118. In some embodiments, hypervisor 116 and one or more of guest OSes 118 may be stored in a computer-readable medium (e.g., a local or remote hard disk drive) other than a memory 104 which is accessible to processor 103. Each guest OS 118 may also be referred to as a "virtual machine."

A hypervisor 116 may comprise software and/or firmware generally operable to allow multiple virtual machines and/or operating systems to run on a single computing system (e.g., an information handling system 100) at the same time. This operability is generally allowed via virtualization, a technique for the physical characteristics of hiding computing system resources (e.g., physical hardware of the computing system) from the way in which other systems, applications, or end users interact with those resources. A hypervisor 116 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, TRANGO, MICROSOFT'S HYPER-V, SUN'S LOGICAL DOMAINS, HITACHI'S VIRTAGE, KVM, VMWARE SERVER, VMWARE WORKSTATION, VMWARE FUSION, QEMU, MICROSOFT'S VIRTUAL PC and VIRTUAL SERVER, INNOTEK'S VIRTUALBOX, and SWSOFT'S PARALLELS WORKSTATION and PARALLELS DESKTOP.

In one embodiment, a hypervisor 116 may comprise a specially-designed os with native virtualization capabilities. In another embodiment, a hypervisor 116 may comprise a standard OS with an incorporated virtualization component for performing virtualization.

In another embodiment, a hypervisor 116 may comprise a standard OS running alongside a separate virtualization application. In this embodiment, the virtualization application of the hypervisor 116 may be an application running above the OS and interacting with computing system resources only through the OS. Alternatively, the virtualization application of a hypervisor 116 may, on some levels, interact indirectly with computing system resources via the OS, and, on other levels, interact directly with computing system resources (e.g., similar to the way the OS interacts directly with computing system resources, or as firmware running on computing system resources). As a further alternative, the virtualization application of a hypervisor 116 may, on all levels, interact directly with computing system resources (e.g., similar to the way the OS interacts directly with computing system resources, or as firmware running on computing system resources) without utilizing the OS, although still interacting with the OS to coordinate use of computing system resources.

As stated above, a hypervisor 116 may instantiate one or more virtual machines. A virtual machine may comprise any program of executable instructions, or aggregation of programs of executable instructions, configured to execute a guest OS 118 in order to act through or in connection with a hypervisor 116 to manage and/or control the allocation and usage of hardware resources such as memory, CPU time, disk space, and input and output devices, and provide an interface between such hardware resources and application programs hosted by the guest OS 118. In some embodiments, a guest OS 118 may be a general-purpose OS such as WINDOWS or LINUX, for example. In other embodiments, a guest OS 118 may comprise a specific- and/or limited-purpose OS, configured so as to perform application-specific functionality (e.g., persistent storage).

At least one host system 102 in information handling system 100 may have stored within its memory 104 a virtual machine manager 120. A virtual machine manager 120 may comprise software and/or firmware generally operable to manage individual hypervisors 116 and the guest OSes 118 instantiated on each hypervisor 116, including controlling migration of guest OSes 118 between hypervisors 116. Although FIG. 1 shows virtual machine manager 120 instantiated on a host system 102 on which a hypervisor 116 is also instantiated, in some embodiments virtual machine manager 120 may be instantiated on a dedicated host system 102 within information handling system 100, or a host system 102 of another information handling system 100.

A network interface 106 may include any suitable system, apparatus, or device operable to serve as an interface between an associated information handling system 100 and internal network 110. A network interface 106 may enable its associated information handling system 100 to communicate with internal network 110 using any suitable transmission protocol (e.g., TCP/IP) and/or standard (e.g., IEEE 802.11, Wi-Fi). In certain embodiments, a network interface 106 may include a physical network interface card (NIC). In the same or alternative embodiments, a network interface 106 may be configured to communicate via wireless transmissions. In the same or alternative embodiments, a network interface 106 may provide physical access to a networking medium and/or provide a low-level addressing system (e.g., through the use of Media Access Control addresses). In some embodiments, a network interface 106 may be implemented as a local area network ("LAN") on motherboard ("LOM") interface. A network interface 106 may comprise one or more suitable NICs, including without limitation, mezzanine cards, network daughter cards, etc.

In some embodiments, a network interface 106 may comprise a SmartNIC and/or a DPU. In addition to the stateful and custom offloads a SmartNIC or DPU may provide, it may have an independent management domain with a separate operating system, independent credentials, and independent remote access. Accordingly, network interface 106 may include its own specialized processor and memory.

In addition to processor 103, memory 104, and network interface 106, a host system 102 may include one or more other information handling resources.

Internal network 110 may be a network and/or fabric configured to communicatively couple information handling systems to each other. In certain embodiments, internal network 110 may include a communication infrastructure, which provides physical connections, and a management layer, which organizes the physical connections of host systems 102 and other devices coupled to internal network 110. Internal network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Internal network 110 may transmit data using any storage and/or communication protocol, including without limitation, Fibre Channel, Fibre Channel over Ethernet (FCOE), Small Computer System Interface (SCSI), Internet SCSI (iSCSI), Frame Relay, Ethernet Asynchronous Transfer Mode (ATM), Internet protocol (IP), or other packet-based protocol, and/or any combination thereof. Network 110 and its various components may be implemented using hardware, software, or any combination thereof.

As discussed above, embodiments of this disclosure may provide techniques for performing firmware updates of various information handling resources of network interface controller 106, which may be a SmartNIC device. Some embodiments may employ Redfish®, which is a communications standard designed to deliver simple and secure management functionality that is supported by many management controllers. Other embodiments may use different communications standards, but the example of Redfish® is discussed in detail herein for the sake of clarity and concreteness.

Turning now to FIG. 2, a block diagram of selected components of an information handling system 200 is shown, according to some embodiments. Information handling system 200 may include host system 202, management controller 212, and one or more SmartNICs 206. Information handling system 200 may further include or be communicatively coupled to remote network share 204. SmartNICs 206 may each include various information handling resources, any or all which may include a firmware that may need to be updated from time to time.

Host system 202 may be coupled to the hardware of SmartNICs 206 via a communication channel such as Peripheral Component Interconnect Express (PCIe) in some embodiments. Management controller 212 may be coupled to host system 202 via one or more communication channels, such as Ethernet over USB NIC, a system management bus (SMBus), etc. Management controller 212 may be coupled to SmartNICs 206 via a network controller sideband interface (NC-SI), which may be established over reduced media-independent interface (RMII) based transport (RBT), over PCIe vendor-defined message (VDM), over SMBus, etc.

Embodiments of this disclosure may use firmware updates that are packaged according to a standardized update package payload. For example, Dell® may provide such updates in a Dell Update Package (DUP) format. Other systems may use other formats, as one of ordinary skill in the art with the benefit of this disclosure will appreciate. The update packages may be received from host system 202 and/or from remote network share 204.

According to one embodiment, management controller 212 may perform a firmware inventory of the different components (not shown separately) of SmartNICs 206. Management controller 212 may then provide firmware payload transfer and activation in parallel based on the types of the components. The SmartNIC firmware inventory may be collected based on the component type via Redfish or NC-SI in some embodiments. As shown, the payloads may be temporarily stored in a repository at management controller 212. Payloads may then be transferred via NC-SI pass-through (PT) private channel, a serial connection, or any other suitable communication channel, and the communication channel may be selected based on the component type in some implementations.

For example, the NC-SI channel may be based on cabling between management controller 212 and SmartNICs 206, which establishes a private, point-to-point network. Management controller 212 may act as a server, and SmartNIC 206 may perform a network boot based on a boot image shared by management controller 212. The boot image may then install any desired firmware updates.

Some components of SmartNICs 206 (e.g., the NIC BMC) may not support such a networked communication channel, however. In such instances, a serial connection may be used instead. In one implementation, the serial connection may be implemented using all or a portion of the same physical cabling as the RBT connection shown in FIG. 2. The serial connection may also include a multiplexer (MUX) to allow management controller 212 to communicate with any desired one of SmartNICs 206 at any given time.

In one embodiment, management controller 212 may broadcast the network path for firmware images to SmartNICs 206 through DHPv6 solicit messages over the NC-SI PT private channel. These messages may be limited to a particular one of SmartNICs 206 based on the broadcast domain. Transfer of the firmware update payloads may occur in parallel in this embodiment.

In some embodiments, the installation of firmware updates according to this disclosure may be possible based on pre-existing trust relationships. For example, management controller 212 may authenticate (e.g., via username and password, authentication token, etc.) an administrator who wishes to install a firmware update, and SmartNICs 206 may have a preexisting trust relationship with management controller 212 based on the NC-SI PT private channel. Thus SmartNICs 206 may trust the administrator based on the authentication performed by management controller 212.

Turning now to FIGS. 3A and 3B (collectively, FIG. 3), a sequence diagram flow chart is shown of an example method 300 for updating firmware components within information handling system including N SmartNICs (where N is an integer greater than or equal to 1), in accordance with some embodiments.

As shown, the host management controller may get the inventory of the internal components of each SmartNIC via Redfish or NC-SI based on the component. When a firmware update is triggered, an update package payload at the host or remote network share may exposes the SmartNIC firmware image.

The host management controller may enable the private Ethernet channel over NC-SI PT over RBT between the selected SmartNIC and the management controller. The management controller may store the payload in a temporary repository within its local storage.

Different types of firmware payload may operate in different manners in some embodiments. For example, for a SmartNIC UEFI update, the management controller may publish the firmware update image URI via DHCPv6 option #59 and allow multiple device updates to be performed simultaneously. The SmartNICs may then download the image, validate the image, and install the respective firmware components simultaneously in parallel.

For a SmartNIC BMC update, the management controller may enable a connection via a serial MUX, establish communication with the SmartNIC BMC, transfer the payload to the SmartNIC BMC, and activate the firmware update process.

For a NIC firmware update, the management controller may publish the firmware update image URI via DHCPv6 option #59 as described above. However, if this technique is not supported by the device, a legacy UEFI FMP method may be used instead.

Regardless of the type of update needed and the manner of transmitting the update to the SmartNIC, the management controller may also identify whether the update requires a host reboot and/or a SmartNIC reboot. For example, a SmartNIC UEFI update may require a reboot of the SmartNIC but not the host; a SmartNIC BMC update may not require any reboots; and a NIC firmware update may require both to reboot. Other types of updates may have other requirements with regard to reboots.

The management controller may also determine whether or not PCIe downstream port containment (DPC) should be enabled for the update. For example, a NIC firmware update may require DPC, while other types of updates may or may not.

Based on the determined requirements, the management controller may then perform the required reboot(s) and/or DPC when deploying the firmware update.

In one embodiment, if DPC is required, then the management controller may send a system management interrupt (SMI) request to the host BIOS to take the selected SmartNIC offline. The SmartNIC may be identified by fully qualified device descriptor (FQDD) to the host BIOS in one implementation, and the host BIOS may then make the respective SmartNIC invisible to the host OS during the update process. Once the firmware is updated, the management controller may send another SMI request to bring the SmartNIC back online, and the host BIOS may then make the respective SmartNIC visible to the host OS again.

One of ordinary skill in the art with the benefit of this disclosure that will understand the preferred initialization point for the method depicted in FIG. 3 and the order of the steps comprising that method may depend on the implementation chosen. In these and other embodiments, this method may be implemented as hardware, firmware, software, applications, functions, libraries, or other instructions. Further, although 3 discloses a FIGURE particular number of steps to be taken with respect to the disclosed method, the method may be executed with greater or fewer steps than depicted. The method may be implemented using any of the various components disclosed herein, and/or any other system operable to implement the method.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112 (f) for that claim element. Accordingly, none of the claims in this application as filed are intended to be interpreted as having means-plus-function elements. Should Applicant wish to invoke § 112 (f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   a host system;
   a host system management controller configured to provide out-of-band management of the information handling system; and
   a network interface controller comprising a network interface controller baseboard management controller (BMC);

wherein the host system management controller is configured to:
  determine an inventory of the network interface controller, the inventory indicating a plurality of components of the network interface controller each having a firmware;
  retrieve firmware update images in parallel for updating each firmware; and
  cause the network interface controller to boot from the firmware update images, the firmware update images being configured to install an update to each firmware.

2. The information handling system of claim 1, wherein the network interface controller is a SmartNIC.

3. The information handling system of claim 1, wherein the firmware update images are retrieved from the host system.

4. The information handling system of claim 1, wherein the firmware update images are retrieved from an external information handling system via a network share.

5. The information handling system of claim 1, wherein at least one firmware is selected from the group consisting of network interface controller firmware configured to control networking functionality of the network interface controller, network interface controller BMC firmware configured to control the network interface controller BMC, and Unified Extensible Firmware Interface firmware configured to control a pre-boot environment of the network interface controller.

6. The information handling system of claim 1, wherein the host system management controller is further configured to publish a location of the firmware update image via Dynamic Host Configuration Protocol version 6 (DHCPv6) option #59.

7. A method comprising, in an information handling system including a host system, a host system management controller configured to provide out-of-band management of the information handling system, and a network interface controller comprising a network interface controller baseboard management controller (BMC):
  the host system management controller determining an inventory of the network interface controller, the inventory indicating a plurality of components of the network interface controller each having a firmware;
  the host system management controller retrieving firmware update images in parallel for updating each firmware; and
  the host system management controller causing the network interface controller to boot from the firmware update images, the firmware update images being configured to install an update to each firmware.

8. The method of claim 7, wherein the network interface controller is a SmartNIC.

9. The method of claim 7, wherein the firmware update images are retrieved from the host system.

10. The method of claim 7, wherein the firmware update images are retrieved from an external information handling system via a network share.

11. The method of claim 7, wherein at least one firmware is selected from the group consisting of network interface controller firmware configured to control networking functionality of the network interface controller, network interface controller BMC firmware configured to control the network interface controller BMC, and Unified Extensible Firmware Interface firmware configured to control a pre-boot environment of the network interface controller.

12. The method of claim 7, further comprising the host system management controller publishing a location of the firmware update image via Dynamic Host Configuration Protocol version 6 (DHCPv6) option #59.

13. An article of manufacture comprising a non-transitory, computer-readable medium having instructions thereon that are executable by at least one processor of a host system management controller of an information handling system including a host system and a network interface controller comprising a network interface controller baseboard management controller (BMC) for:
  determining an inventory of the network interface controller, the inventory indicating a plurality of components of the network interface controller each having a firmware;
  retrieving firmware update images in parallel for updating each firmware; and
  causing the network interface controller to boot from the firmware update images, the firmware update images being configured to install an update to each firmware.

14. The article of claim 13, wherein the network interface controller is a SmartNIC.

15. The article of claim 13, wherein the firmware update images are retrieved from the host system.

16. The article of claim 13, wherein the firmware update images are retrieved from an external information handling system via a network share.

17. The article of claim 13, wherein at least one firmware is selected from the group consisting of network interface controller firmware configured to control networking functionality of the network interface controller, network interface controller BMC firmware configured to control the network interface controller BMC, and Unified Extensible Firmware Interface firmware configured to control a pre-boot environment of the network interface controller.

18. The article of claim 13, wherein, the instructions are further executable for publishing a location of the firmware update image via Dynamic Host Configuration Protocol version 6 (DHCPv6) option #59.

* * * * *